US012077981B2

(12) United States Patent
Amsellem et al.

(10) Patent No.: US 12,077,981 B2
(45) Date of Patent: Sep. 3, 2024

(54) ALUMINUM FENCE SYSTEM

(71) Applicant: Alumission Inc., Oxnard, CA (US)

(72) Inventors: Itsik Amsellem, Ventura, CA (US); Ben Sasson, Fillmore, CA (US); Zach Sasson, Fillmore, CA (US)

(73) Assignee: Alumission Inc., Oxnard, CA (US)

( * ) Notice: Subject to any disclaimer, the term of this patent is extended or adjusted under 35 U.S.C. 154(b) by 0 days.

(21) Appl. No.: 18/341,614

(22) Filed: Jun. 26, 2023

(65) Prior Publication Data

US 2023/0340801 A1 Oct. 26, 2023

Related U.S. Application Data

(63) Continuation of application No. 17/898,315, filed on Aug. 29, 2022, now Pat. No. 11,746,559.

(60) Provisional application No. 63/296,126, filed on Jan. 3, 2022.

(51) Int. Cl.

| | |
|---|---|
| ***E06B 11/02*** | (2006.01) |
| ***E04H 17/00*** | (2006.01) |
| ***E04H 17/16*** | (2006.01) |
| ***E04H 17/20*** | (2006.01) |

(52) U.S. Cl.

CPC ........... *E04H 17/20* (2013.01); *E04H 17/013* (2021.01); *E04H 17/16* (2013.01); *E04H 17/21* (2021.01); *E06B 11/02* (2013.01)

(58) Field of Classification Search

CPC ....... E04H 17/16; E04H 17/013; E04H 17/20; E04H 17/21; E06B 11/02

See application file for complete search history.

(56) References Cited

U.S. PATENT DOCUMENTS

| | | | | |
|---|---|---|---|---|
| 7,121,531 B1 * | 10/2006 | Gonzalez | E05B 65/0007 256/73 |
| 11,746,559 B2 * | 9/2023 | Amsellem | E04H 17/013 256/34 |
| 2009/0078923 A1 | 3/2009 | McGinness | |

FOREIGN PATENT DOCUMENTS

| | | |
|---|---|---|
| EP | 3 401 468 | 11/2018 |
| EP | 3 483 381 | 5/2019 |
| FR | 2 770 867 | 5/1999 |
| FR | 2 983 895 | 6/2013 |

(Continued)

OTHER PUBLICATIONS

Translation of FR 2 983 895: worldwide.espacenet.com. Jan. 25, 2024.*

(Continued)

*Primary Examiner* — Michael P Ferguson

(74) *Attorney, Agent, or Firm* — SoCal IP Law Group LLP; Jonathan Pearce

(57) ABSTRACT

The fence system attaches to an aluminum or steel rectangular base post in concrete or the ground. The inside wall of a fence column slides over the base post. The fence column also has an outside wall around the inside wall. Each of three side of the fence column has an elongated slot, which receives one end of a slat. A bracket may secure the slat to the fence column. The fence system also has a gate of the same style as the rest of the fence. A lockset housing replaces one fence column. It receives slats on one side, and the lockset's latch projects from the other side. A hollow post has a slot facing the latch when the gate is closed. A latch cover is held by the slot, and an extension of the latch cover extends along the lockset housing to block surreptitious opening the gate.

16 Claims, 16 Drawing Sheets

(56) References Cited

FOREIGN PATENT DOCUMENTS

| | | | |
|---|---|---|---|
| FR | 3 005 079 | 10/2014 | |
| FR | 3 041 013 | 5/2018 | |
| WO | WO 2005/116360 | * 12/2005 | ............. E04F 11/18 |

OTHER PUBLICATIONS

Translation of EP 3 401 468: worldwide.espacenet.com. Jan. 25, 2024.*

"China Easy Install Private Wpc Aluminum Fence Wpc Fence Set—Buy Wpc Fence Set, Easy Install Private Wpc Aluminum Fence, Wpc Fence China Product On Alibaba.Com". 2022. Alibaba. Com. https://www.alibaba.com/product-detail/China-Easy-Install-Private-Wpc-Aluminum_1600338128956.html.

"Classic Aluminum Fence—Body A". 2022. Body A. https://www.bodymem.co.il/%d7%92%d7%93%d7%a8-%d7%90%d7%aa/.

Translation of EP 3 401 468. worldwide.espacenet.com. Mar. 16, 2023.

Translation of FR 2 770 867. worldwide.espacenet.com. Dec. 14, 2022.

* cited by examiner

ALUMINUM FENCE SYSTEM

RELATED APPLICATION INFORMATION

This patent claims priority from non-provisional patent application Ser. No. 17/898,315, filed on Aug. 29, 2022, entitled ALUMINUM FENCE SYSTEM. application Ser. No. 17/898,315, now U.S. Pat. No. 11,746,559, claims priority to provisional patent application 63/296,126, filed Jan. 3, 2022, entitled ALUMINUM FENCE SYSTEM.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to fencing systems and gates.

Description of the Related Art

Many types of residential and commercial fencing exist. One type is pre-cut wooden fence posts with and panels or slats. Installers using those systems may purchase a desired number of posts, sink them with concrete, attach them with crossbars, and nail the slats to the crossbars. These fences have a more rustic, rough-cut feel that some find unattractive for certain applications.

Wrought iron fencing is also common. It usually is sold in panels, but to fit in the perimeter of a property or yard, panels must be cut to desired lengths with an acetylene torch. Wrought iron also is heavy, about 0.28 lb./in.$^3$ though most components of wrought iron fencing are hollow and the pickets are spaced. Wrought iron fencing requires strong metal or brick posts to support them. Gates for wrought iron fencing usually are custom made and sized using a welder. Wrought iron becomes expensive because of the labor costs for a welder, the expense of sturdy posts, and the material and shipping cost of using iron. Wrought iron also is subject to rust and corrosion and needs regular painting especially in damp or rainy climates.

Chain link fence is widely available and inexpensive. It comes in rolls, and may be installed using standard posts and fittings. Many find chain link fencing unattractive, particularly for higher-end homes, and it often degrades and looks worse over time as fittings loosen, sections sag, and the bottom may become spaced from the ground.

One fencing solution for modern-style homes is fine-cut redwood or cedar fencing. The slats typically are installed horizontally between vertical posts, but the slats can be installed vertically. The slats may be arranged with wider slats and smaller slats interspersed with one another for aesthetic purposes. The support structure's posts usually are redwood or cedar, but they it may be metal. The posts typically are sunk in concrete or fixed to existing concrete or structures. These fences can be attractive especially for modern homes, but they are labor intensive. To appear appropriately, the slats must be cut precisely. Fine-cut, pre-sanded, and fine-grained redwood or cedar which are typically used is costly, three to five times the price of rough-cut fence slats. Though redwood and cedar resist weathering better than other wood, rain, snow, ice, and sunlight can still cause degradation so components must be replaced or at least periodically re-sanded and stained or painted.

Steel-based systems are said to mimic the shape and clean lines provided by the fine-cut redwood and cedar fences, but working with steel can be difficult. Steel must be cut with an acetylene torch, and a welder usually must attach the slats to steel posts and cross members. Steel slats may be painted and are strong but they can be heavy, difficult to install, and welding each member takes time and money for a professional welder.

Vinyl fencing systems exist. The vinyl fencing is easy to cut, simple to install, uninform in color (usually white), lightweight, and relatively aesthetically pleasing. However, vinyl stands up to heat quite poorly. The slats sag or fall out and usually must be screwed to a cross member or post. The connections between slats and posts often are visible. The slats themselves cannot be used alone for support because the vinyl is not sufficiently strong and rigid. So, support members are often included and spacing between posts must generally be closer than with metal-based systems.

SUMMARY

Most components shown herein are made from powder-coated aluminum. Aluminum is lightweight, less than 0.1 lb./in.$^3$ (2.8 g/cm$^3$), substantially less than iron or steel. The light weight allows the persons constructing the fence system to move the aluminum components easily. Shipping is likewise less expensive. The powder coat or anodization can come in many colors and designs. The components here are hollow so any comparison with other material such as wrought iron must account for parts being hollow. For the thicknesses applicant uses, the components can be cut using a conventional electric miter saw and remain strong enough to be placed without additional non-aluminum support.

The principal components are extruded 6063 alloy powder-coated aluminum. Anodized aluminum is another choice, but powder coating allows for more colors and designs. Several components including a fence column have a complex cross-section for which forming by extrusion is ideal, and the 6063 alloy is a suitable choice for extrusions though other alloys also may be suitable.

The fence system attaches to aluminum or steel rectangular base posts that attaches to a fence column. The inside wall of a fence column fits over the base post. The fence column also has an outside wall around the inside wall. Each of three side of the fence column has a slot wide enough to accommodate one end of the slats. A bracket attaches the end of the slat to the fence column to secure the slats in place and provide rigidity to the entire structure. Additional slats may be added adjacent to the slat above or below, and spacers may leave space between the slats. The slats may be the same height, or their heights can vary for aesthetic purposes. All slots have grooves so empty slots can receive a slot cover, and areas between spaced slats can receive covers sized to fit in the space between slats. The slot covers likewise provide uniform spacing between the slats and an overall aesthetic, clean appearance.

A plate covers the open end on top of the fence column, and self-drilling screws extend through apertures in the plate and secure the plate to the fence column's open end. Other plate covers attach to other open ends of fence columns or similar members used for other than a fence column. An adhesive secures a post cap to the top of the fence column and the plate.

The fence system also includes a gate, which may have two intersecting members: fence column (vertical) and platform (horizontal). The platform is at the bottom of the gate, and structure like the platform may be at the gate's top. The fence column and platforms may have the same extruded shape. A short post secures the fence column and platform together.

The horizontal platform is positioned with a slot open upward and a slot open downward. A bolt extends through a hole in the platform to a threated opening in a short post within the fence column to secure the fence column to the platform.

An L-brace though the centers of the horizontal platform and the vertical fence columns could secure them together. To cover the intersection of the L-brace's horizontal and vertical sections, the adjacent ends horizontal platform and vertical fence column are cut at a 45° angle so they intersect at a right angle and cover the L-brace.

DETAILED DESCRIPTION

Figure 1:
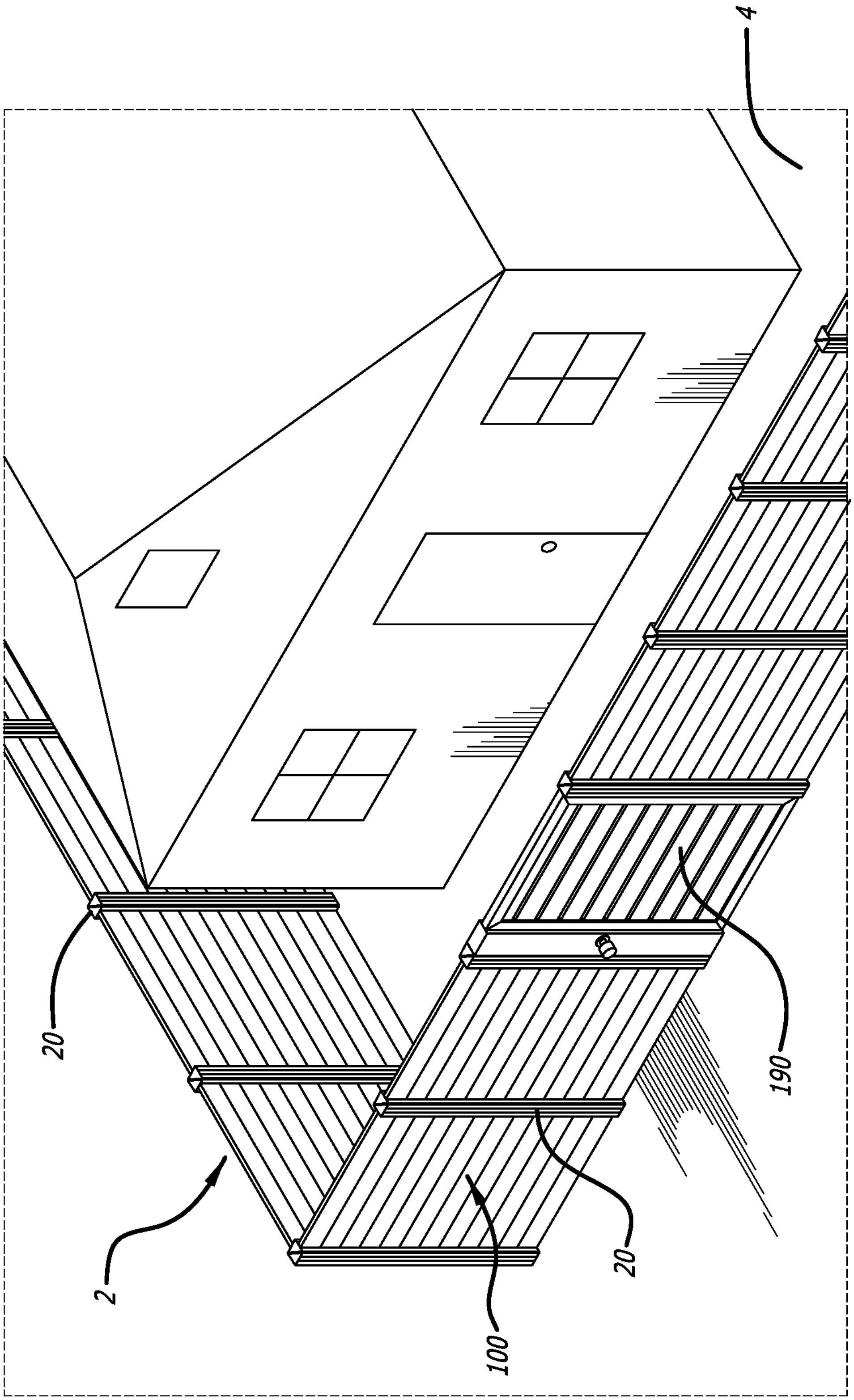
FIG. 1 is a perspective view of applicant's fence surrounding a building.

Overview: Applicant's fence system 2 surrounds or partially surrounds property 4 (FIG. 1). The fence system's fence column 20 attaches to steel or other metal square, rectangle, or polygon base post 10 (FIGS. 2, 2A-2D, 3, 11). Those figures also show the structure of fence column. Having a base post with the same shape as the base post prevents or limits pivoting of the fence column about the base post. The base post could be round, but that would require a different inside shape of fence column 20, but a round-to-round connection may allow the fence column to pivot about the base post. Though the specification uses "rectangle," the word encompasses the other shapes. But the drawing show a square or nearly square base with rounded internal and external corners.

Figure 2:
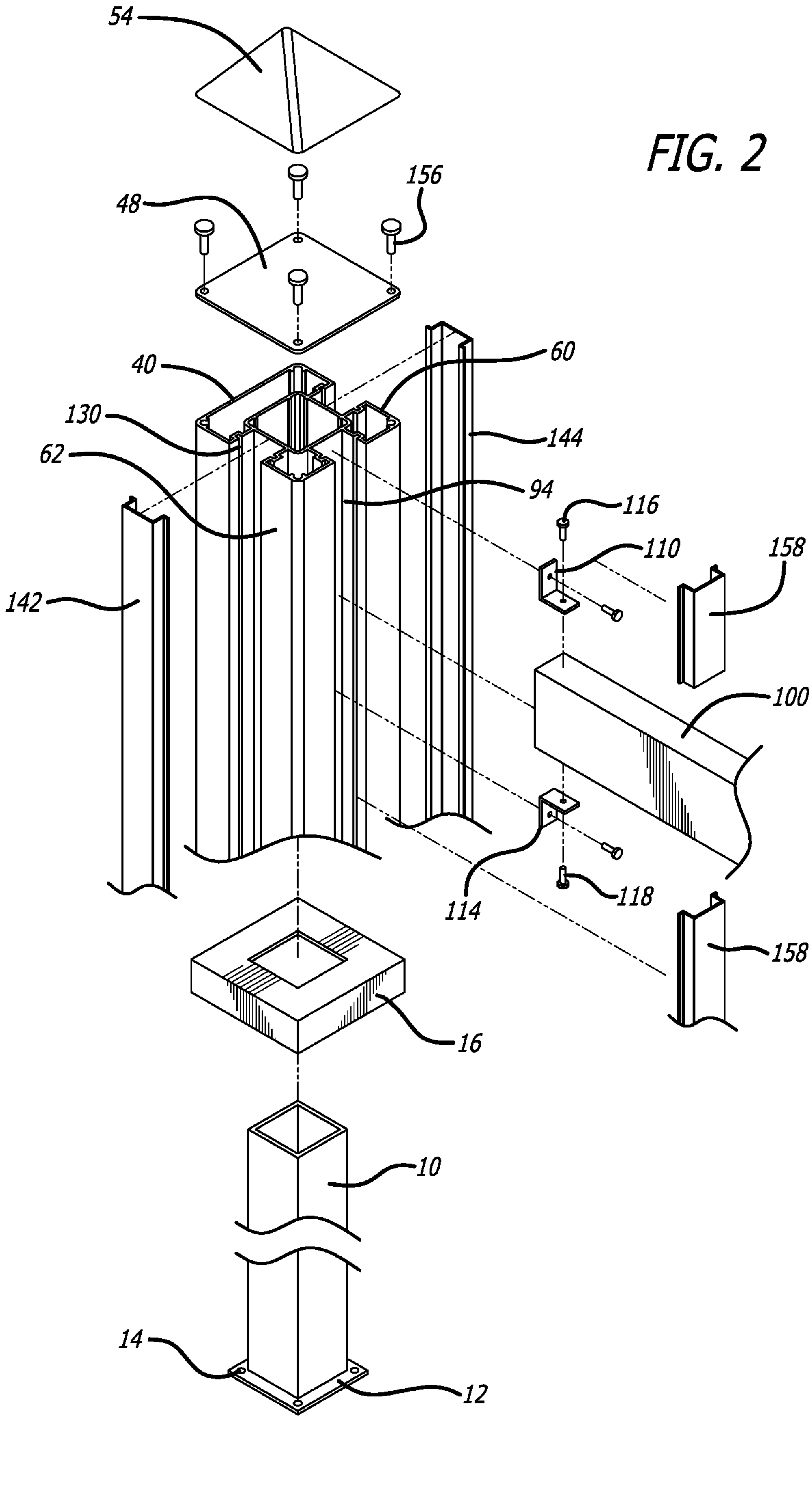
FIG. 2 is an exploded view of parts of applicant's fence.
Figure 2A:
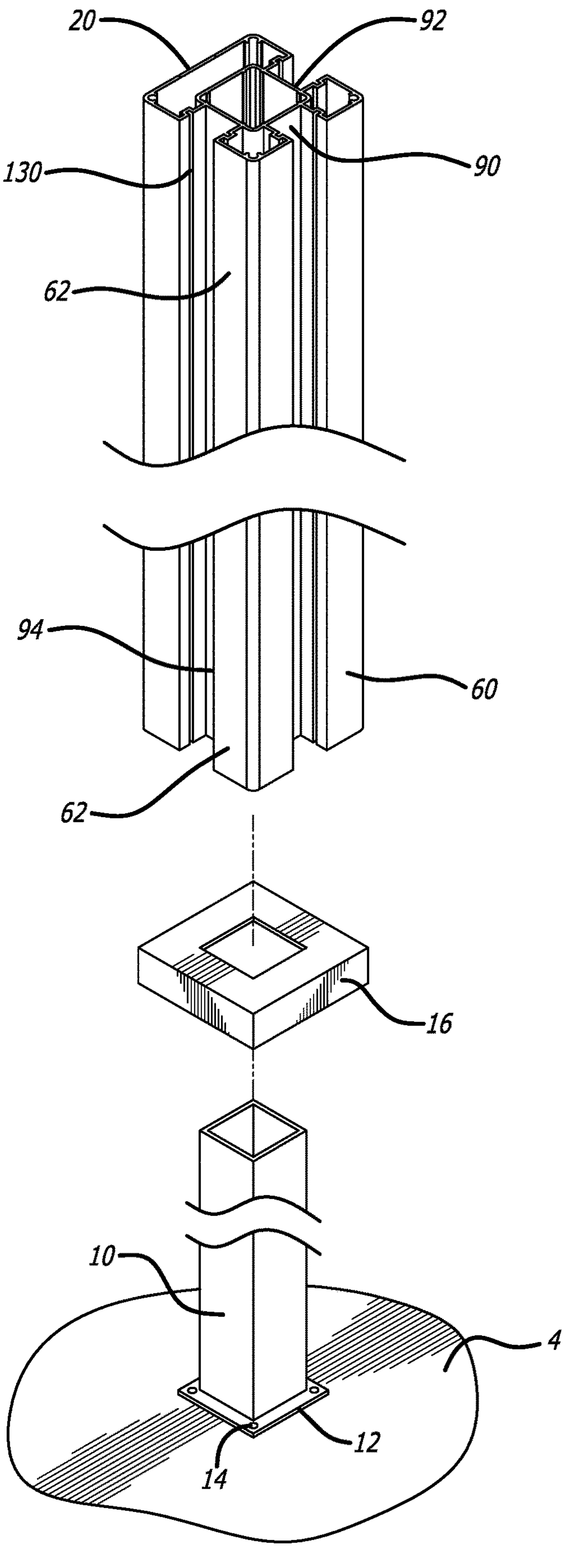
FIG. 2A is an exploded view of parts of applicant's fence.

Base post 10 can attach to concrete, deck, soil, or to the top of a brick, block, or concrete wall. The base post may be painted or treated to resist corrosion or rust. Base post 10 in FIGS. 2, 2A-D attaches to concrete or a deck 2. The base post in the figures is 1.25 in. (3.175 cm)×1.25 in., but opposite walls may be elongated slightly. Conversions between English and metric are approximated. The base post may have outer flange 12 with screw openings 14 (FIGS. 2, 2A, 2D). Bolts (not shown) secure the flange to concrete. The bolts may extend upward from the concrete when the concrete is poured. Then nuts secure the flange to the bolt and concrete.

Cover 16 slides over the base post. The inside wall of a fence column slides over the base post (FIGS. 2, 2A-2D). The cover hides the outer flange and bolts for a pleasing appearance.

To mount the base post on soil, an 18 in. to 24 in. (46 cm to 61 cm) hole is dug. After concrete is poured into the hole, the base post is pushed into the soft concrete and plumbed to be vertical. Whether base posts 10 are in concrete or soil, the base posts are aimed to account for the path of the fence system.

Figure 3:
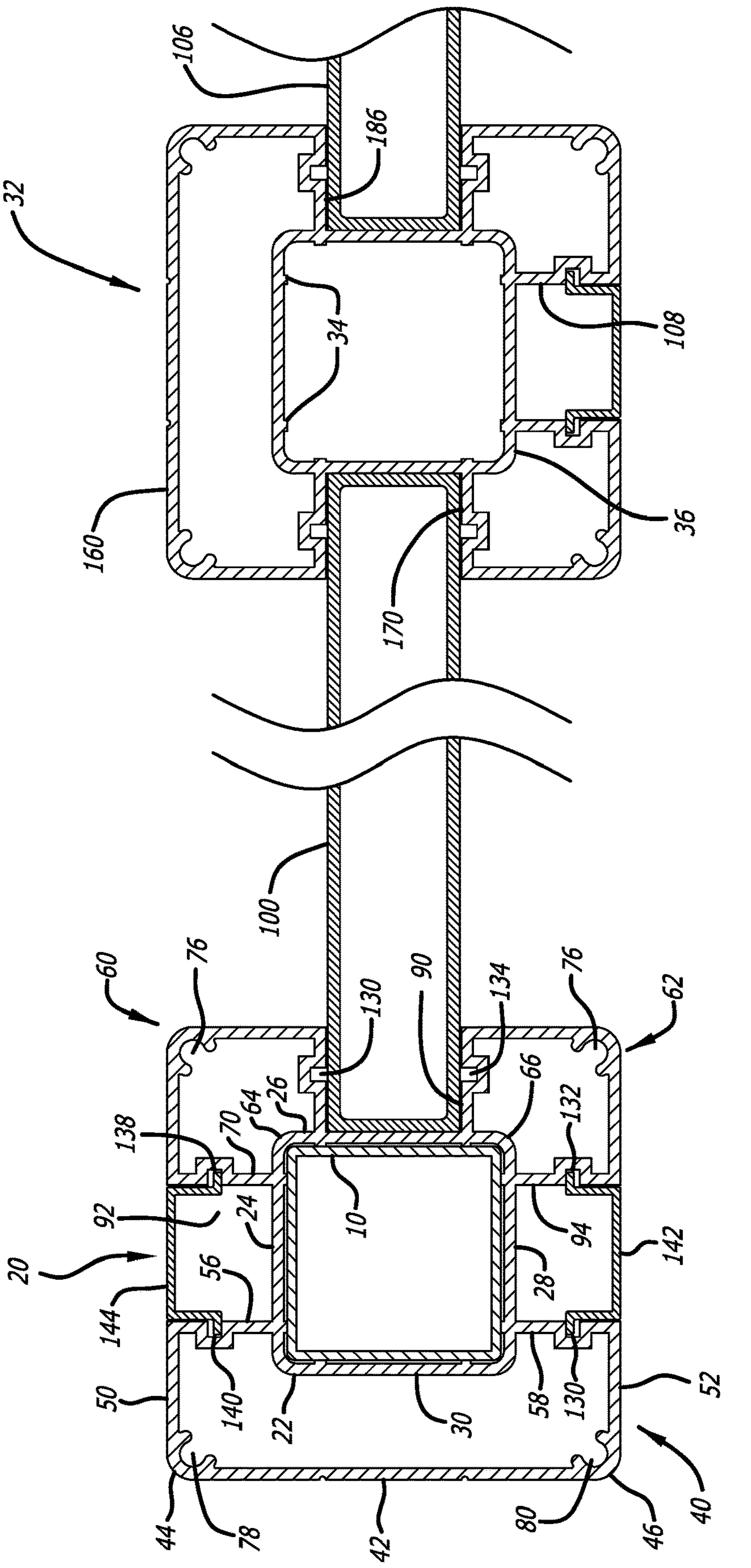
FIG. 3 is a sectional plan view of applicant's fence.

Connection of slats to fence column: Fence slats 100 extend between fence columns 20 around property 4 (FIG. 1). The fence column (FIG. 3 and others) has a base post receiver, inside wall 22, around base post 10. The inside wall has four sides 24, 26, 28, and 30 (FIG. 3). Adjacent inside walls meet at a 3.4 mm (0.13 in.) outside radius. The inside spacing between walls 24 and 28 is 33 mm (1.3 in.), and the inside dimension between walls 26 and 30 is 34 mm (1.3 in.). Inside wall 22 is almost square to fit with the base post 10. The thickness of the aluminum components may vary, but it typically is 1.78 mm (0.07 in.).

Screws, other fasteners (not shown) or an adhesive may secure the base post to the inside wall, but friction may suffice. See also projections 34 on inside wall 36 of the other fence column 32 (FIG. 3). Those projections are small enough to allow the base post to pass into the inside wall but the productions deform when the base post is inserted in inside wall 36 to push against the base post and hold the base post within the inside wall. Fence column 32 on the right side of FIG. 3 does not show a base post within inside wall 36.

Fence column 20 also has outside tubular member 40 attached to and spaced outside of inside wall 22 (FIGS. 2, 2A-2D, 3, 11). Because fence column 20 is extruded, "attached" in the context of the fence column means components are in contact or in such near contact that the aluminum maintains the components' positions with each other. The outside tubular member includes base member 42 with first and second ends 44 and 46 (left side of FIG. 3). The distance between the ends is greater than the length of inside wall 30 (FIG. 3). The base member's width may be 70 mm (2.8 in.) versus 33 mm (1.3 in.) for inside wall 22. End walls 50 and 52 continue from end 44 and 46 and then continue as sidewalls 56 and 58 to intersect fourth and first inside walls 30 and 24 (FIG. 3).

Three-sided pillars 60 and 62 extend outward near corners 64 and 66 of inside wall 22 (FIG. 3). Open-ended gaps like gap 76 are at the outside corners of pillars 60 and 62. Depending on the location of the end of fence column 20, the gaps receive self-drilling screws 156 for holding cover plate 48 at the top of fence column 20 (FIG. 2). Gaps 78 and 80 on the ends of outside tubular member 40 perform a similar function. Silicone or other adhesive attaches pyramid cover 54 above cover 48 (FIG. 2) to keep water, debris, and insects out of fence columns 20. Cover 48 and pyramid cover 54 may be attached to exposed ends during construction to keep rain or dirt outside the fence column 20 or other appropriate components.

The sizes and positions of outside tubular member 40 and three-sided pillars 60 and 62 create three slots 90, 92 and 94 (FIGS. 2, 2A-2D, 3). The slots are sized to receive one end of one or more elongated slats such as slat 100 received in slot 94 (FIG. 2D, 3, 9, 10). The slots' width dimension are wide enough to accommodate one end of a slat like slat 100. Additional slats may contact the slat below, or the slats may be spaced from adjacent slats.

Slats 100 may be powder-coated aluminum, which can be cut to length with an electric miter saw. Each slat's width may be 20.6 mm (0.8 in.). The height of each slat may be 140 mm (5.5 in.), 50 mm (2 in.) or another height. The slats in the drawings are rectangular in cross-section and a height 102 that may exceed its width 104 (FIG. 2B).

Figure 2B:
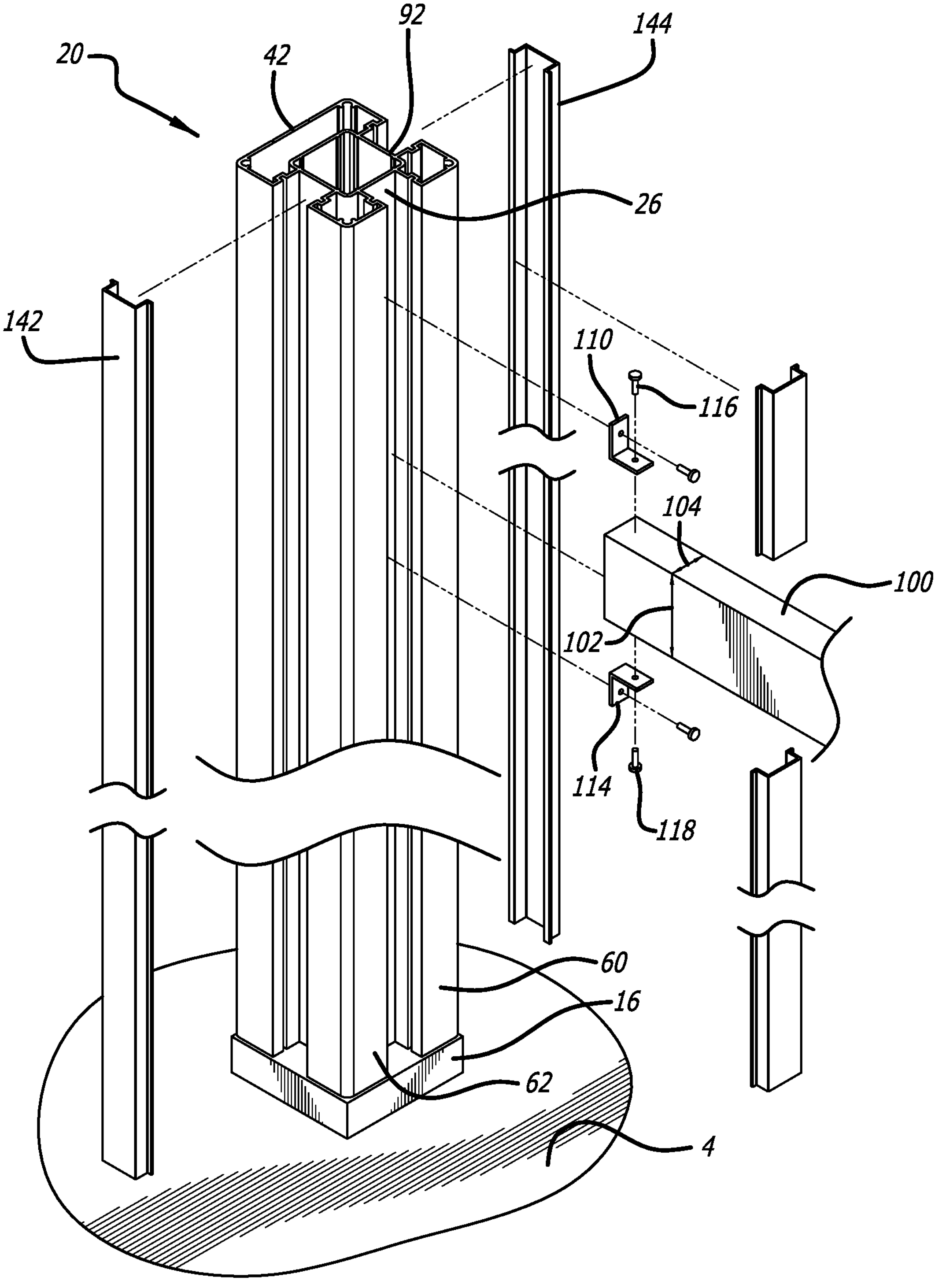
FIG. 2B is an exploded view of parts of applicant's fence.
Figure 2C:
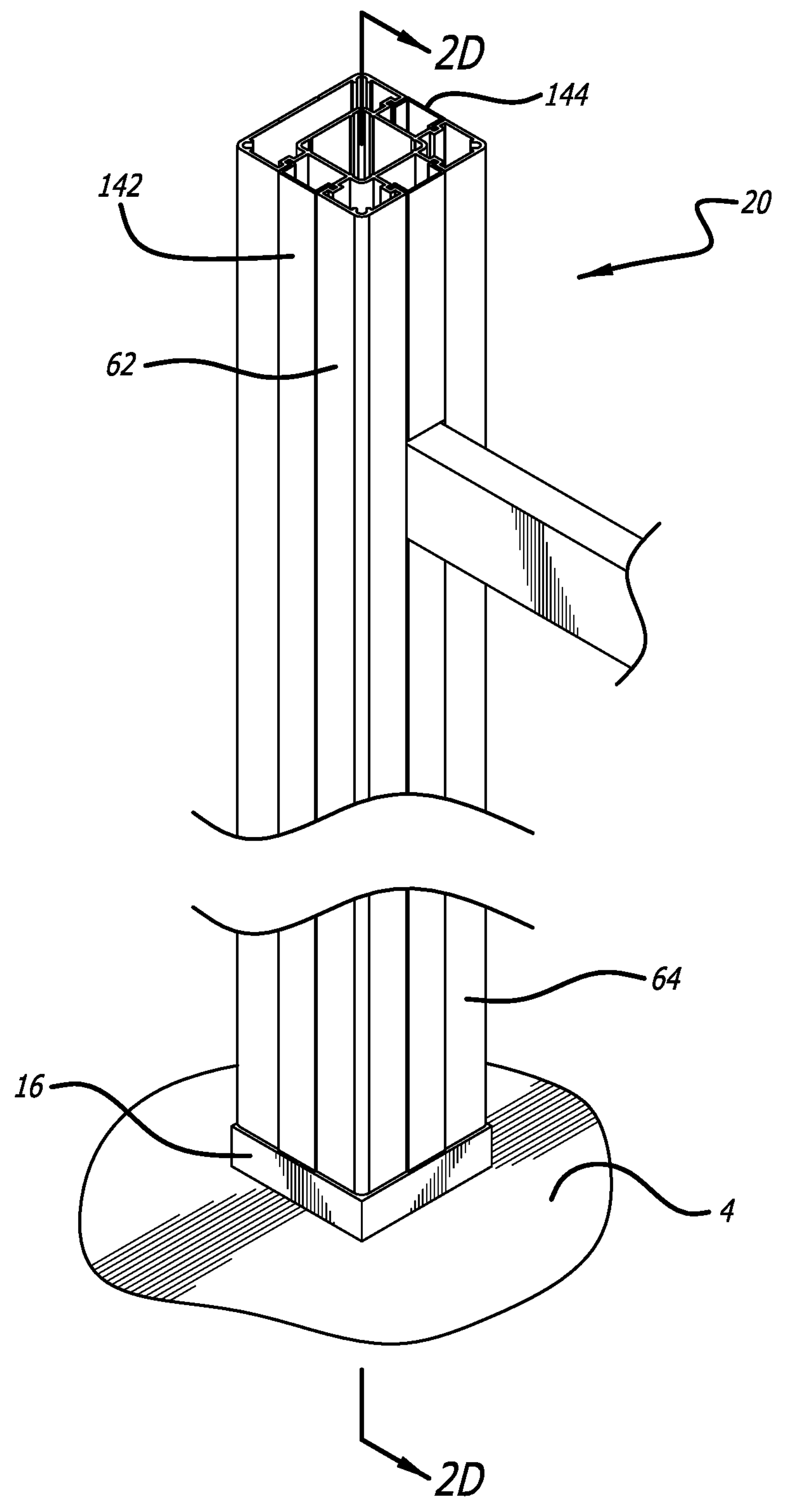
FIG. 2C is an exploded view of parts of applicant's fence.
Figure 2D:
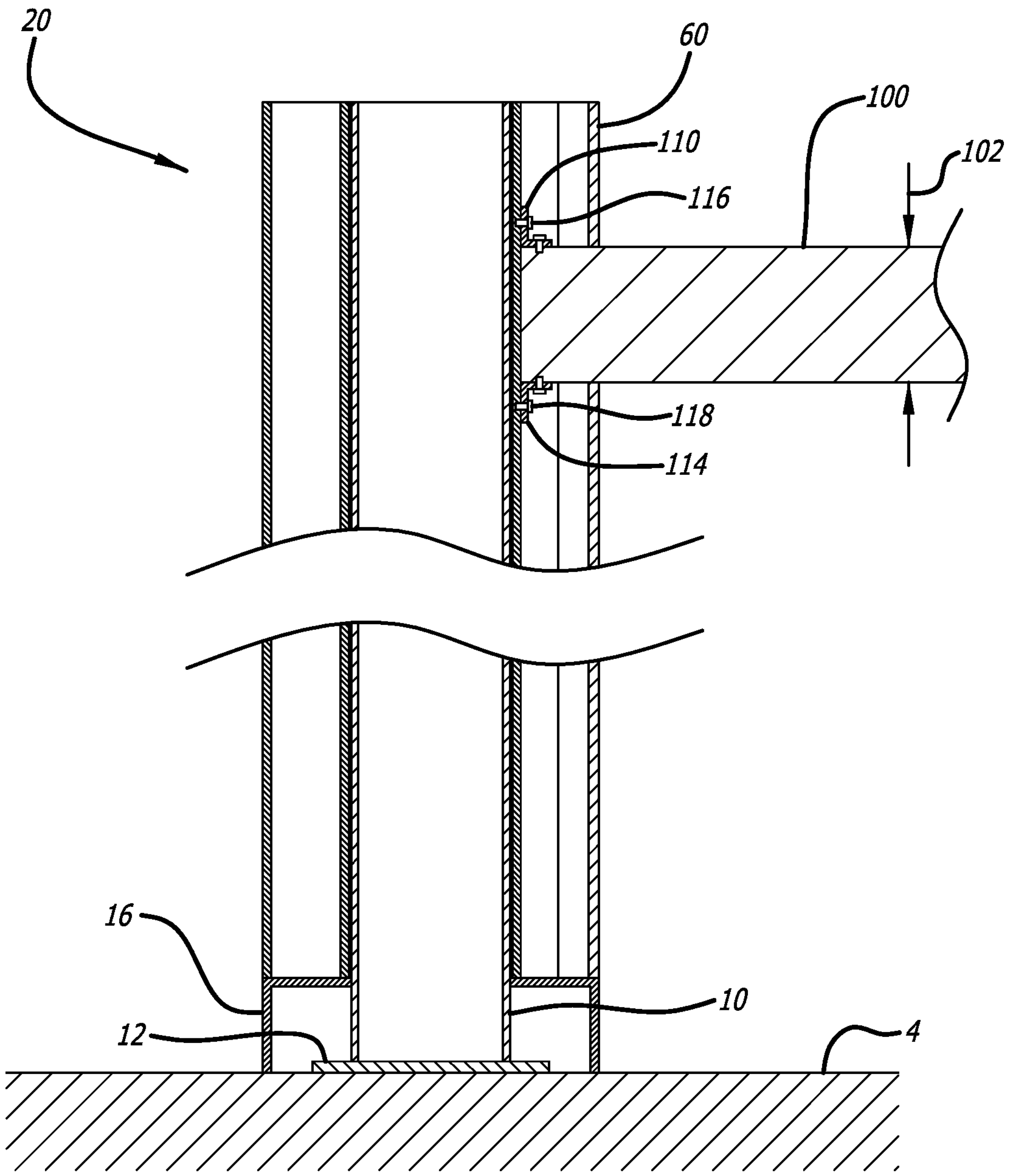
FIG. 2D is a sectional front view of applicant's fence through plane 2D-2D in FIG. 2C.

Stainless steel, L-shaped fasteners 110 and 114 and their associated stainless steel, self-driving screws 116 and 118 through wall 26 secure slat 100 to wall 26 at the inside end of slot 94 (FIGS. 2, 2B, 2D). Stainless steel screws work well securing parts like the L-shaped fasteners into the aluminum slats and fence column 20.

Each sidewall of slots 90, 92, and 94 has opposing grooves 130, 132, 134, 136, 138, and 140 (FIGS. 2, 2A-D, and 3) formed during extrusion. Slot covers such as covers 142 and 144 cover unused slots in the fence member (FIGS. 2B, 3). Each slot cover has an outside wall 146 and two sides 148 and 150, each with a distal shoulder 152 and 154. The distal shoulders are sized to fit in their respective groove like groove 130 (FIGS. 2, 2A-2C, 3). When the distal shoulders at the bottom of the slot cover are inserted into the grooves of a slot, the slot cover can be glided through its grooves to cover its empty slot. Though the structure uses grooves in the slots for the slot covers, when the slot cover reaches its final position, they may be fastened with an adhesive or in other ways at their positions in the slots.

The slats extend from one fence column 20 to adjacent fence column 32 (FIG. 3). With the three slots 90, 92 and 94 (FIGS. 2A-2C and 3), the fence system is not limited to a straight line. In FIG. 3, for example, slat 100 extends from slot 90 of fence column 20 into slot 170 of fence column 32. Another slat, 98 extends from slot 186 in the same general direction as slat 100. Slat 98 also could extend from slot 188 at a right angle to slat 100. Turning fence column 32 180° extends slot 188 in the opposite right angle in FIG. 3.

Increasing the slots' widths slightly may allow changing the angles that the slats, e.g., 98 and 100, project from fence column 20 so the fence can accommodate irregular property shapes. Angled slats still are secured by screws through L-shaped fasteners 110 and 118.

Figure 4:
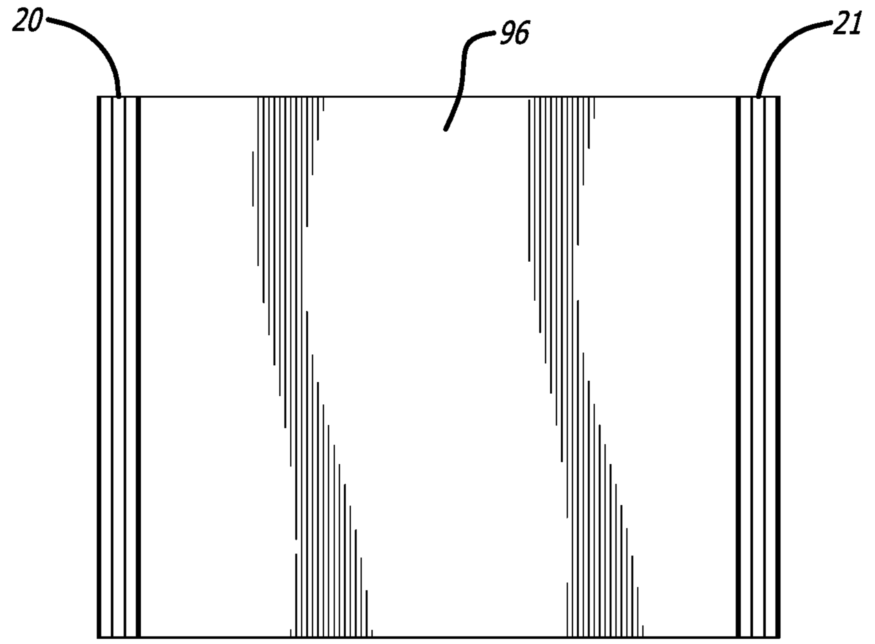
FIG. 4-7 are front views of different slat arrangements of the fence.

Slats' Positioning: FIGS. 4 through 7 show four of many possible slat arrangements. FIG. 4 has 140 mm slats 96 in which the bottom of one slat rests on the top of the adjacent slat. From a distance, the arrangement may appear solid. A similar arrangement could have 140 mm slat 100, 50 mm slat 106 or another height slat or a mixture of them stacked above each other.

Figure 5:
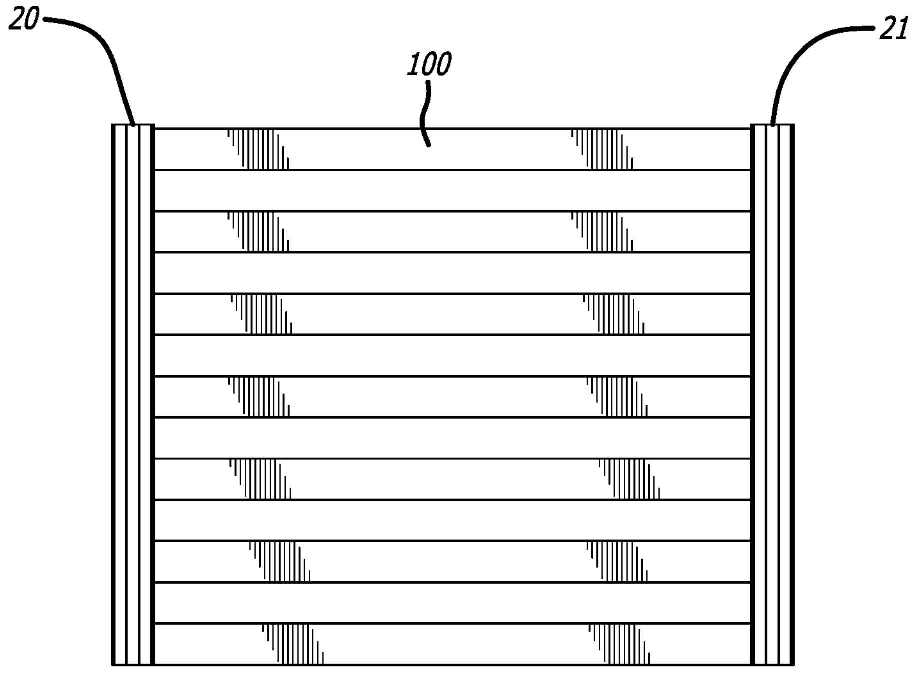
Figure 6:
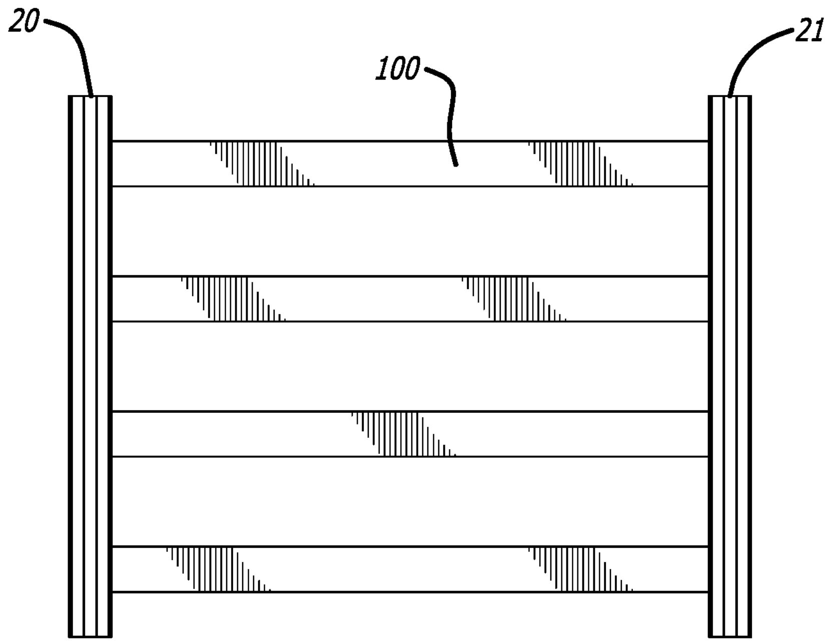
Figure 7:
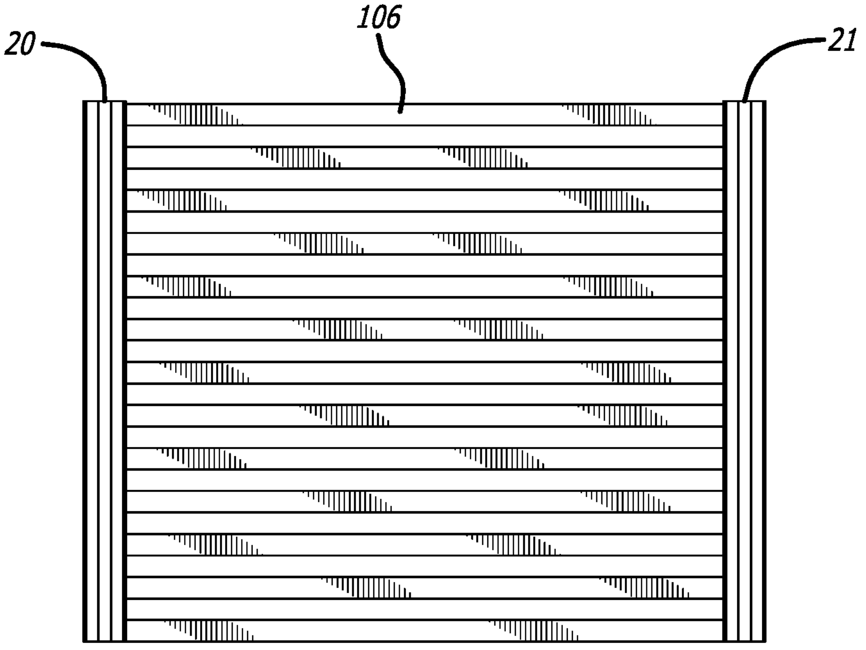

Slats 100 in FIG. 5 are about 140 mm high and are spaced apart about 140 mm apart. The 140 mm slats 106 in FIG. 6 are spaced apart farther than those in FIG. 5, and the 50 mm slats in FIG. 7 are spaced about 50 mm apart. Note the slats in FIGS. 5 and 7 and the single slat in FIG. 4 are aligned with the top and bottom of the fence columns 20 and 21, but the top and bottom slats in FIG. 6 are spaced from the top of the fence columns. FIGS. 5 through 7 only use slats of one width. Slats of two different widths and even three or more widths can be used.

L-shaped fasteners 110 and 118 secure slats to fence columns 20 in fence system with spacing between the slats, (FIG. 2). That spacing could leave parts of slot 94, the L-shaped fasteners 110 and 114, and screws 116 and 118 visible and exposed. Spacers 158 (FIGS. 2, 2C) can cover those parts of the otherwise open slot. Spacers have the same shape as slot covers 142 and 144. After one slat 100 is secured in place, spacer 158 is slid through grooves like groove 130 and 134 until it contacts the slat. Then another slat is slid through the slot and secured to wall 26. The process continues until the top slat is secured to its position.

Figure 11:
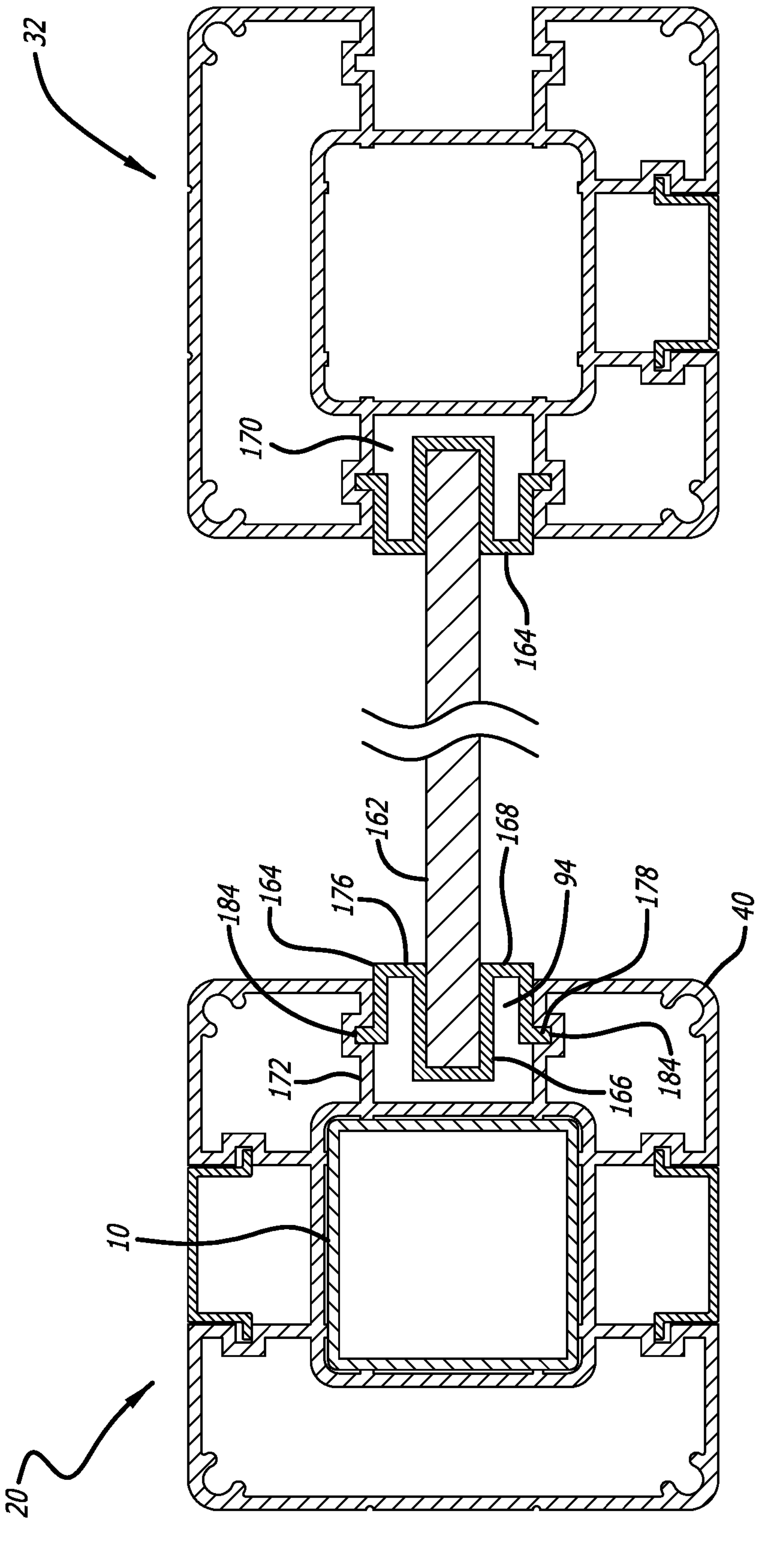
FIG. 11 is a sectional plan view of a section of applicant's fence with a thinner slat like a glass slat.

A window of transparent material like glass or plastic 162 may replace one or more aluminum slats (FIG. 11). The transparent material allows light to shine through, and the resident and guests can see out. The window also could be frosted or translucent to allow light to pass through it.

Glass window 162 extends between fence columns 20 and 32 into slots 90 and 170 (FIG. 11). The window may thinner than applicant's aluminum slats, and it may be taller or shorter than any slat. Clip 164 secures the window in the slot. The clip has a U-shaped portion 166, which is the width of the glass piece. FIG. 11 shows how the window fits in the U-shaped portion. Side projections 168 and 176 project out from the U-shaped section to about the width of the slot, and distal projections 172 and 178 fit into the slot. Distal shoulders 176 and 180 project outward from wall 172 and 178 into slot grooves 182 and 184 to position clip 164.

Gates: The fence system can include sliding or pivoting door-like gates such as pivoting gate 190 (FIG. 1). Because gates slide, roll or pivot, they don't attach to concrete, deck or soil. Gates, especially sliding and rolling ones, may be wider than the spacing of conventional fence sections like those in FIG. 1, so stronger, more rigid tops and bottoms may be desirable.

Figure 12:
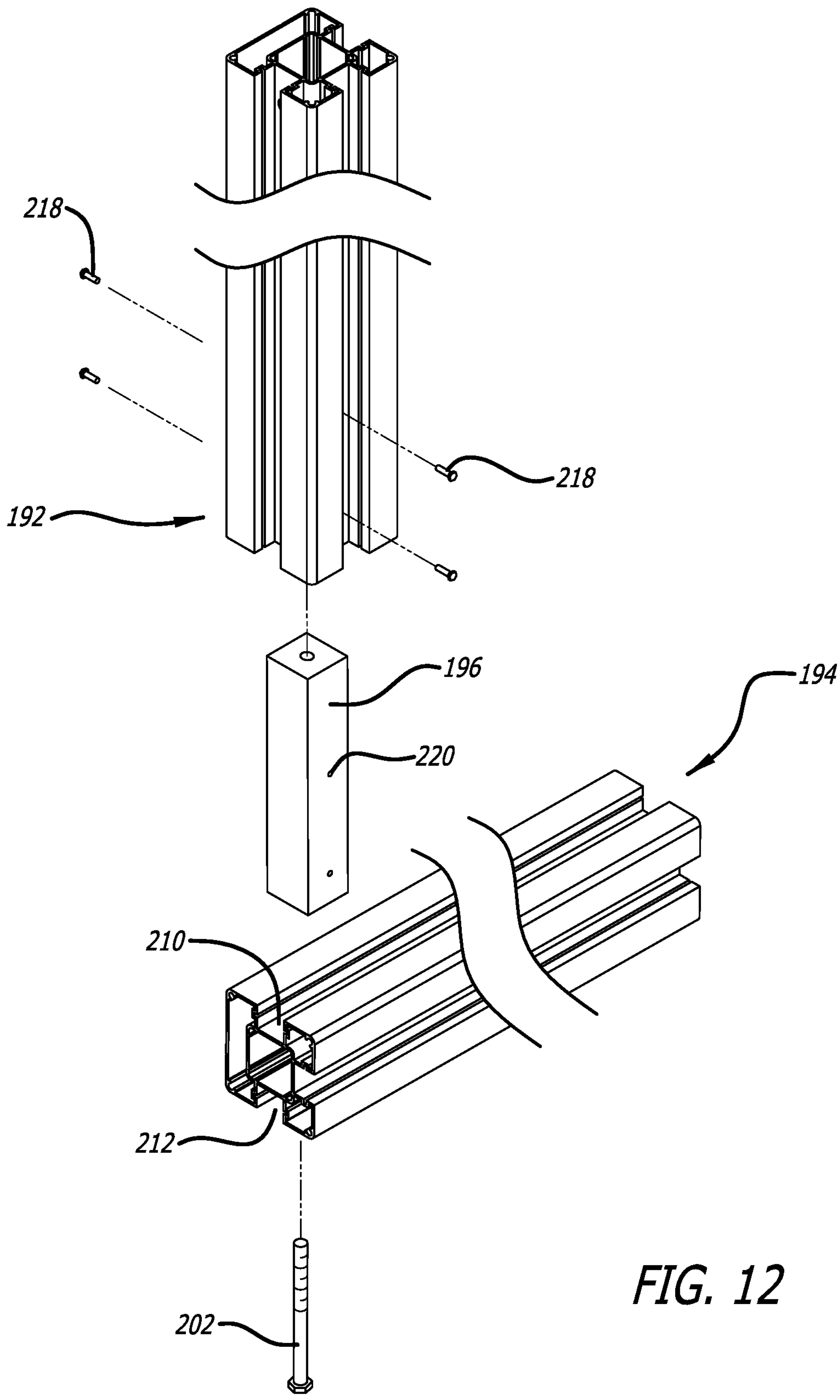
FIG. 12 is an exploded, perspective view showing a connection between two fence columns connected at right angles to each other.
Figure 13:
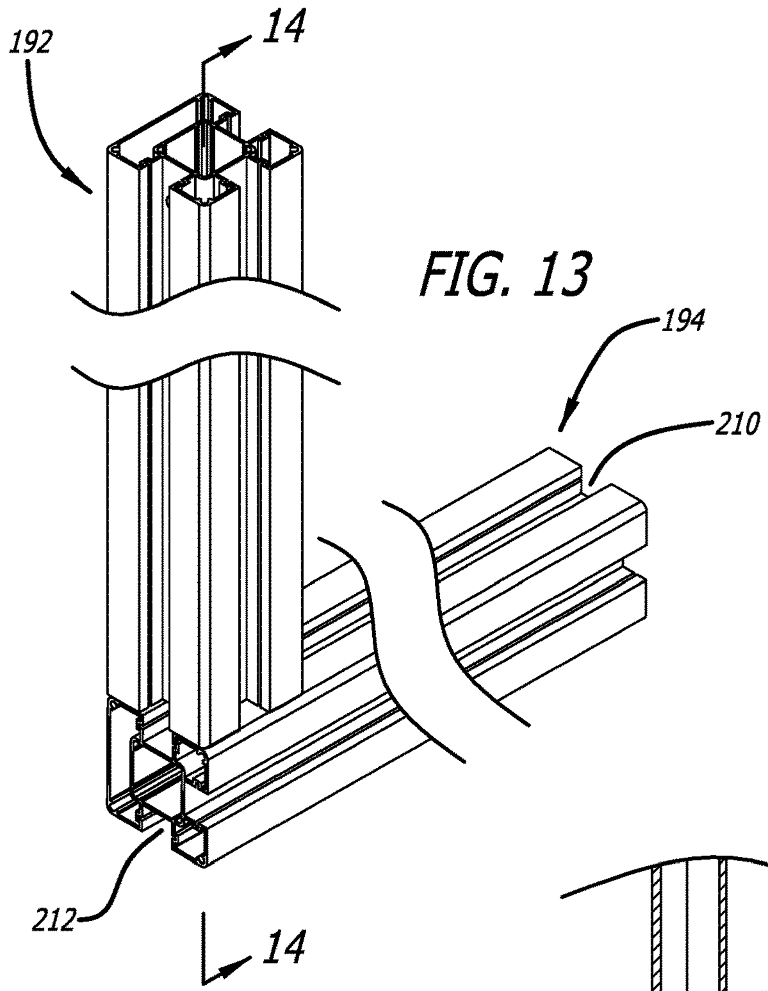
FIG. 13 is a perspective view with the two fence columns connected at right angles to each other

The gate may have two intersecting members: fence columns 192 (vertical) and platform 194 (horizontal) (FIGS. 12-13). Both may have the same shape as fence column 20 (FIG. 3). Using the same fence columns allows builders to keep one component in inventory for both locations, but different dimensioned fence columns could be used. Applicant uses horizontal platform 194 at the bottom of gates (FIGS. 12-13), but the horizontal platform also can be used on fence sections that are not gates.

Figure 14:
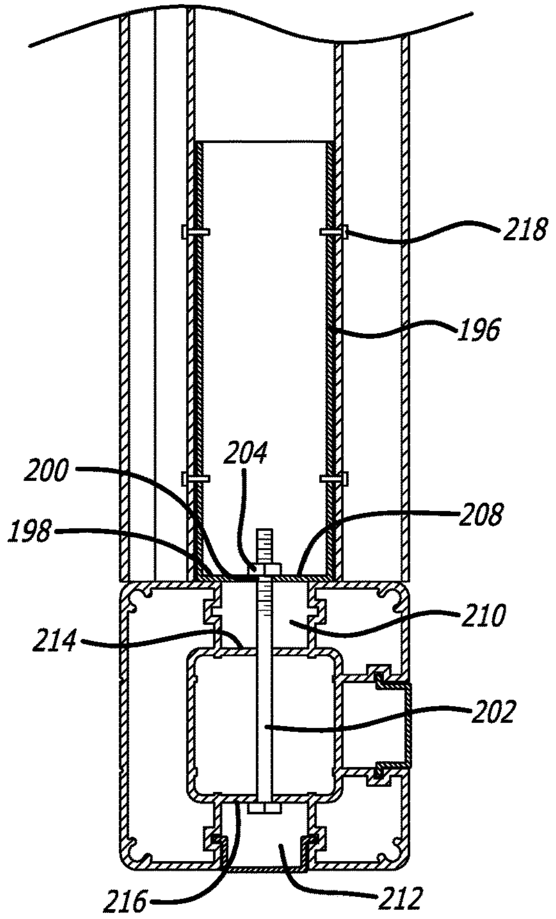
FIG. 14 is a sectional plan view of structure for applicant's fence through plane 14-14 of FIG. 13.

Vertical fence column 192 extends upward from horizontal platform 194. See FIGS. 12-15. The horizontal platform becomes a base with its bottom aligned with and at a right angle to the vertical fence column. Instead of a base post attached to the ground like base post 10 in FIGS. 2, 2A, 2D, and 3, applicant uses a short post 196 secured to vertical fence columns 192 and to horizontal platform 194 (FIGS. 12, 14). Those figures show one short post, but a gate usually has at least two short posts at opposite sides of the gate. Longer gates also may have one or more intermediated, spaced-apart, short posts to improve support.

Short post 196 may be hollow and have the same outer dimensions as base post 10 (FIG. 3 and others). The short post may be coated carbon steel or stainless steel to withstand corrosion. Instead of using bolt 210 and nut 204, the bottom end 208 of the short post may be welded shut, and the end would have a threaded opening 200 for receiving a modified bolt like bolt 202 (FIGS. 12 and 14). A drilled hole (not numbered) extends through inside walls 214 and 216 of the horizontal platform and through the bottom wall 198 if short post 196 (FIG. 14).

To install the short post, horizontal platform 194 is positioned with slot 210 open upward and slot 212 open downward (FIGS. 12-14). Bolt 202 fits through the holes and engages threaded opening 200 to connect to the short post. FIG. 14 shows nut 204 secured to the end of the bolt, but a nut may be unnecessary when opening 200 and bolt 202 have common threads to be secured to each other. If a nut is used, a locking washer (not shown) between head 206 of the bolt and the horizontal platform 194 also could secure the bolt.

Until components are aligned, having the bolt remain loose may be advantageous. Smaller screws 218 (FIGS. 12, 14) may be threaded through the slots into preexisting, threaded openings 212 in post 196 for securing the post to its fence column. Inserting those screws also may await aligning the components.

For a wide gate, one or two additional short posts like short post 196 may mount at spaced-apart locations between the ends of the gate. These short posts support a fence column with slots extending to the sides for receiving slats with the layout of the layout used between fence columns.

Rolling gates have wheels facing downward from the bottom fence column. The wheels may travel over a metal track attached to concrete under the gate. The support for the wheel attaches to a bolt through the bottom fence column (not shown).

During assembly, slot covers like cover 142 and 144 (FIGS. 2B and 3) are slid into place. Then the slats like slats 100 and 106 are inserted in the slots of vertical post column 192 attached by an L-shaped fastener like fastener 110. The first inserted slat may mount in slot 200 of vertical fence column 194, or using fasteners, the first inserted slat may be spaced from horizontal platform 194.

To make the gate more rigid, a similar arrangement of the horizontal and vertical fence columns may mount on the top to the gate after the slats are positioned between the vertical fence columns.

An alternate arrangement for a fence section uses an L-brace 224 (FIG. 15) to secure vertical fence column 192 and horizontal platform 222 at the top of the fence section. The L-brace may be steel for strength and may be formed from one square, hollow crosspiece with outside dimensions the same as or like short post 10's dimensions. The steel may be treated or painted for rust and corrosion prevention. The L-brace is cut to a desired length at a 45° angle, and one piece is rotated 180°. The 45°-angle ends are welded together to form the L-brace's horizontal section 226 and vertical section 224.

Figure 15:
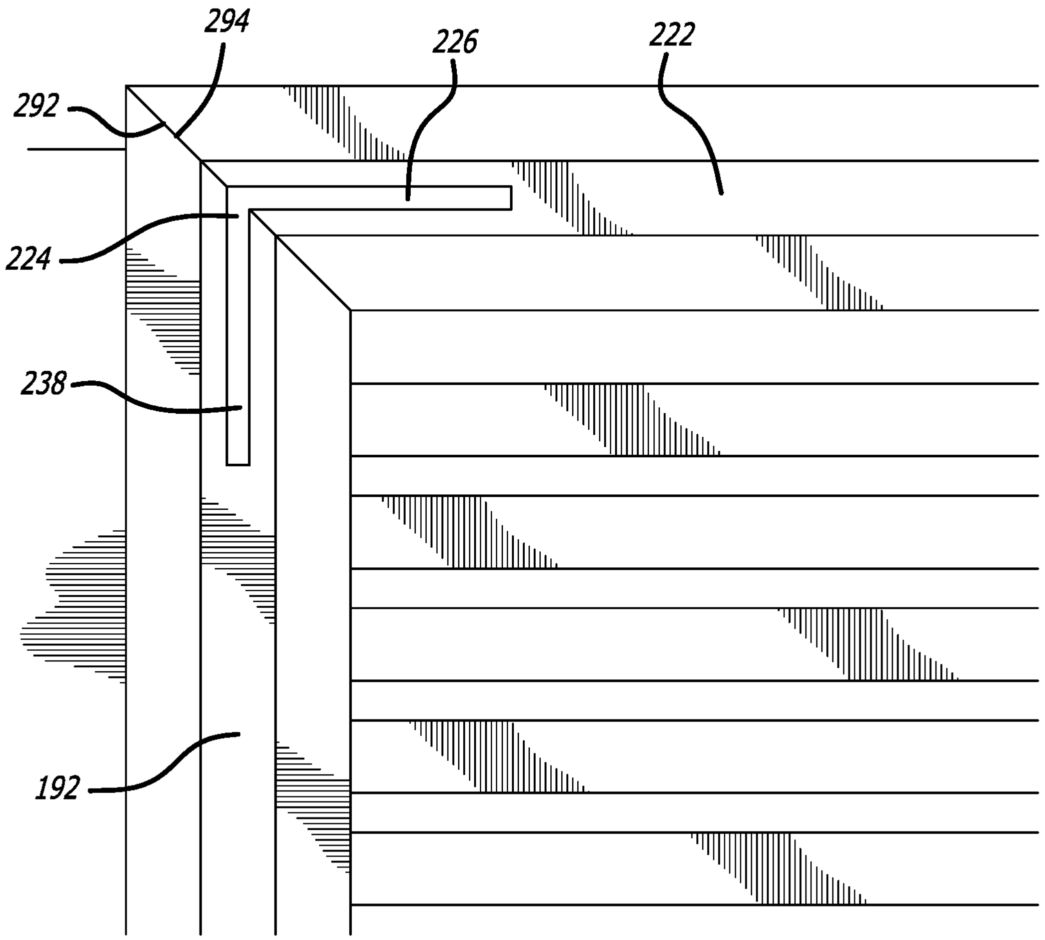
FIG. 15 is front view of a top corner of applicant's fence with an internal bracket.

The free end 226 of L-brace 220 extends into a center section of horizontal platform 228, and the L-brace's vertical section 228 extends into the center section of vertical fence column 232. FIG. 15 shows neither center section, but they are formed from an inside wall like wall 22 in FIG. 3. Screws (not shown) through the slots of the fence column and platform into the L-brace secure the fence columns to the L-brace. Because the L-brace is steel, the bracket's holes may be predrilled and tapped.

To cover the region near the intersection of L-brace 224's horizontal section 226 and vertical section 224, the adjacent ends 292 and 294 of the horizontal platform and vertical fence columns are cut at a 45° angle so they intersect to form a right angle. Self-drilling screws may extend through the fence columns into predrilled holds in L-brace 224 after ends 292 and 294 are brought together tightly.

For swing gates, a fence column like fence column 20 mounts vertically on a base post like post 10, attaches to another stationary fence column, or attaches to a concrete, block, stucco, wood, or brick wall. One or more hinges (not shown) attach the fence column that pivots with the gate to the stationary object.

Figure 8:
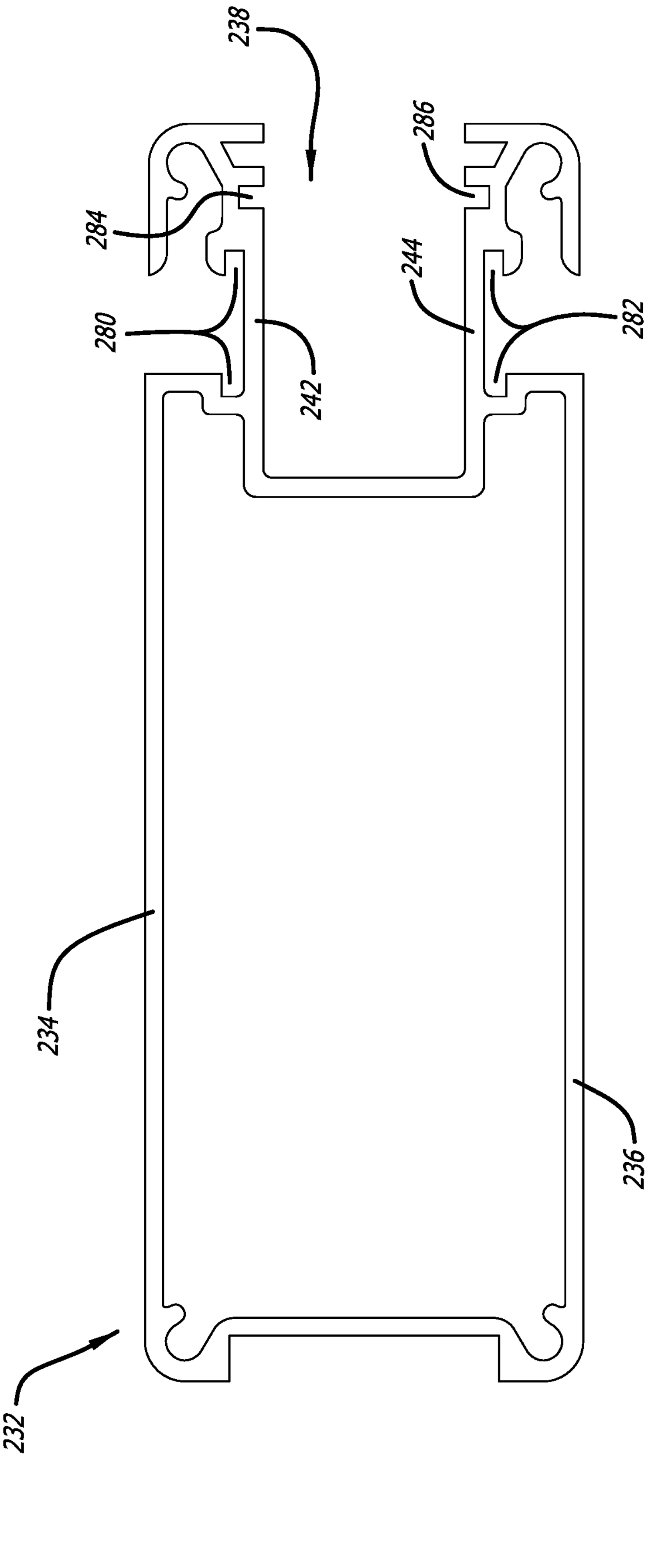
FIG. 8 is a sectional plan view of a component of applicant's fence used as part of a gate.
Figure 9:
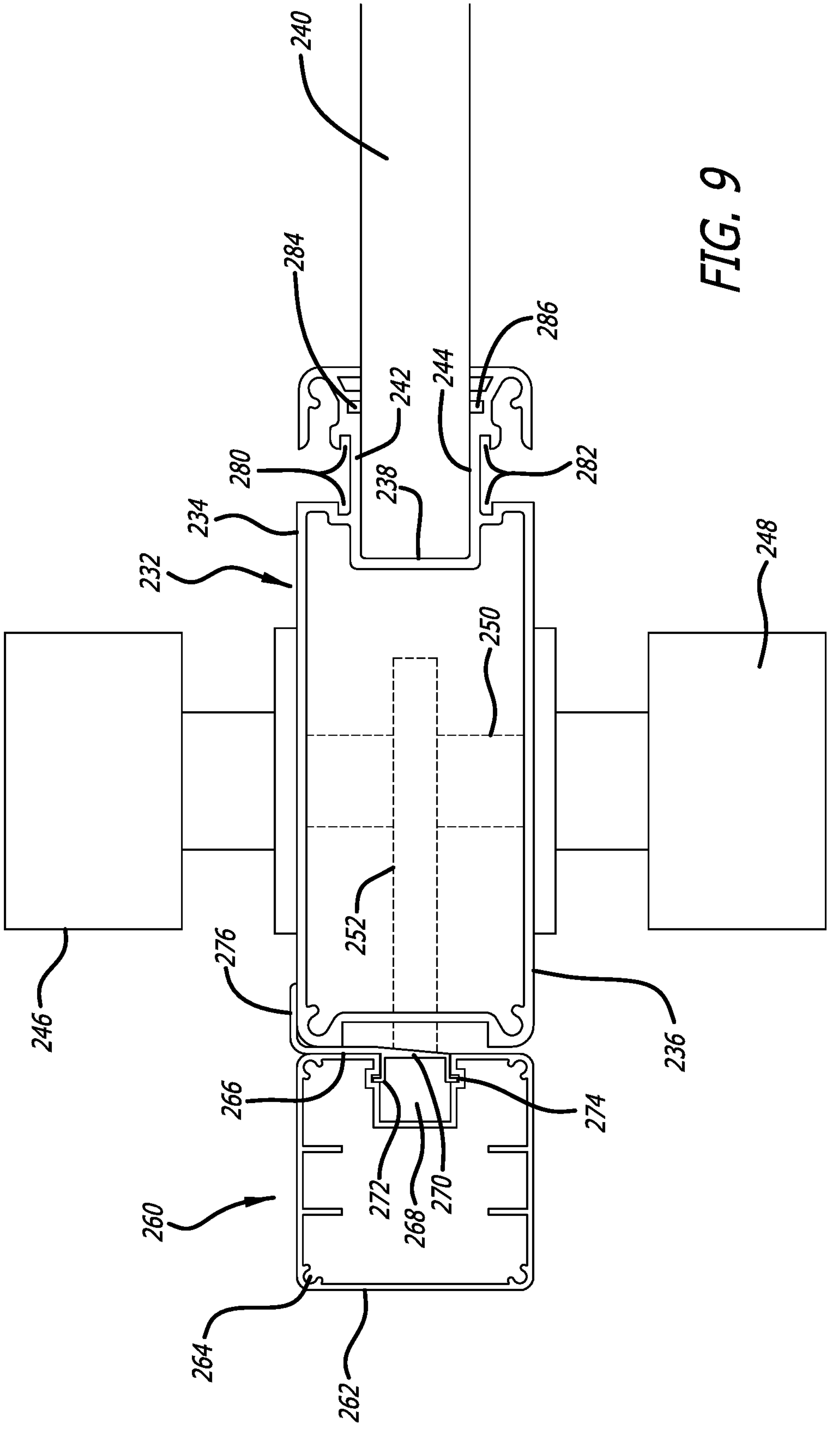
FIG. 9 is a sectional plan view of components of applicant's fence used as part of a gate.
Figure 10:
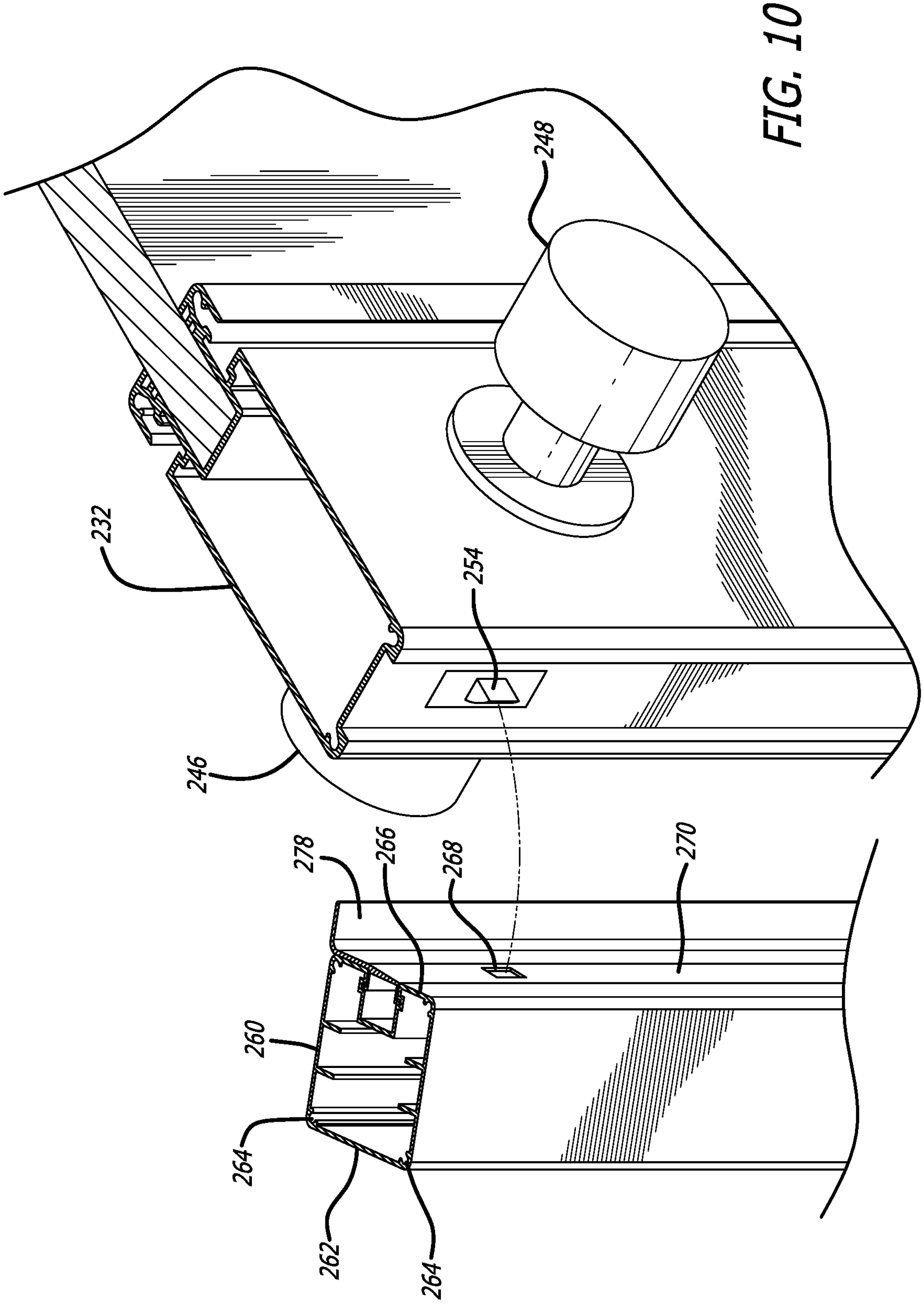
FIG. 10 is a perspective view the door structure of applicant's fence.

FIGS. 8, 9, and 10 show components for the side of the swinging gate that swings open and close. Lockset housing 232 replaces fence column 20 from other figures. It has two elongated sides 234 and 236. The right end (FIGS. 8 and 9) forms a slot 238 that receives slats 240. The slats are stacked like they are in other sections of the fence. These slats may be held in place by L-shaped fasteners (not shown) like fastener 110 and 118 in FIG. 2B. Self-drilling screws (not shown) also may extend through walls 240 and 242 near the right end of the lockset housing 232 into the slats. See FIG. 9.

Lockset housing 232 receives a lockset, which includes doorknobs 246 and 248 (FIG. 9). The doorknobs extend through drilled holes (not shown) through elongated walls 232 and 234. The drilled holes are typically about 3.5 ft. (≈1.1 m) above the ground. The doorknobs attach to other lockset structure based on instructions often included with purchased locksets.

Parts of the lockset extend from the doorknobs to a conventional mechanism 250 inside lockset housing 232. Rotating a doorknob causes the mechanism to move latch assembly 252 to the right (FIG. 9) to withdraw latch bolt 254 (FIG. 10). Releasing the doorknobs in the other direction allows the bolt to move outward as FIG. 10 shows. Because the lockset is conventional, and the installer can choose among different locksets, the installer uses components for the chosen lockset. The lockset latch may include a dead-latch plunger to block that may prevent an intruder from using a screwdriver, credit card or other flat device to push the latch inward to open the gate.

Instead of or in addition to latch 254, the gate may have a deadbolt lock (not shown) as part of the lockset. Applicant also could use a lock for sliding gates such as a sliding gate lock from Locinox USA. The lockset may use electronics for opening the latch through fingerprint recognition, a numeric combination, or remote through wi-fi or other wireless network protocols.

Post 260 for the gate (FIGS. 9 and 10) may be extruded aluminum. Its back wall 262 may attach to a building wall to another fence column like fence column 20. It also may be attached to the ground though a post. Slot 268 in post 260 has gaps 264 at the inside corners the receive screws for attaching a cover. Post 260's front wall 266 receives slot cover 270 in grooves 272 and 274 (FIG. 9), and opening 268 in the slot cover receives latch 254 when the gate is pivoted closed. Front wall 266 includes extension 276 that extends a short distance along elongated wall 236 (FIG. 9). The extension blocks intruders from reaching latch 252 to force the gate open. Extension 276 should face outward from the property, and the gate opens in toward the opposite direction. See FIG. 10.

Narrow walls 242 and 244 at the right side of elongated walls 234 and 236 (FIG. 9) have grooves 280 and 282 for receiving slot covers (not shown). Those covers may be sized to align with the outside surface of elongated walls 234 and 236. Other grooves 284 and 286 also may receive spacers like spacers 158 (FIG. 2) between slats.

Grooves like groove 130 (FIG. 2) inside the three fence column's slots like slot 90 run the length of the fence column. Slot covers may slide into those grooves to create a near-uniform flat face for the side with the slot cover.

Having no visible slots makes the fence column smooth and aesthetically pleasing. When slats are installed in a slot, the slot cover hide the slats' open ends and any rough edges made while cutting the aluminum.

Locating the slots along the fence columns' three sides enables the fence columns to be used for straight fence sections and for corners turning "left" or "right" along a fence row. The final side of the fence column, base wall 42, has no groove because that side needs no panels installed to that side.

The description is illustrative, not limiting and is for example only. Although this application shows and describes examples, those having ordinary skill in the art will find it apparent they can make changes, modifications or alterations. Examples may involve specific combinations of method acts or system elements, but those acts and those elements may be combined in other ways to achieve the same objectives. Acts, elements and features discussed only with one embodiment are not intended to be excluded from a similar role in other embodiments.

"Plurality" means two or more. A "set" of items may include one or more of such items. The terms "comprising," "including," "carrying," "having," "containing," "involving," and similar words in the written description or the claims are open-ended, i.e., each means, "including but not limited to." Only the transitional phrases "consisting of" and "consisting essentially of" are closed or semi-closed transitional phrases regarding claims. The ordinal terms like "first," "second," "third," etc., in the claims don't by themselves connote any priority, precedence, or order of one claim element over another or the temporal order in which acts of a method are performed. Instead, they merely are labels to distinguish one claim element having a certain name from another element having a same name (but for the ordinal term's use). Alternatives like "or" include one or any combination of the listed items. "Applicant" means the assignee of this application at the time of filing.

It is claimed:

1. A gate for a fence system comprising:

a stationary first upright fence column, formed of a single piece, the first upright fence column having an inside wall sized to receive a base post and an outside wall around the inside wall;

the first upright fence column including at least one slot extending the length of the first upright fence column from the outside wall toward the inside wall, the at least one slot having opposing grooves along opposing sidewalls thereof adapted to receive distal shoulders of a latch strike plate;

a latch strike plate comprising:

a slot cover extending the length of the at least one slot and configured to be modified to include a latch opening for engaging with a latch bolt;

a pair of opposing clip walls extending through and along the length of the at least one slot and having opposing distal shoulders to engage the opposing grooves; and a strike extension extending the length of the at least one slot, the strike extension for engaging a second upright fence column forming a portion of a gate when the gate is closed; and a second upright fence column forming a portion of a gate panel, formed of a single piece, the second upright fence column having a hollow cross-section defining an outside wall, incorporating a second slot extending the length of the second upright fence column to receive a fence slat therein, and incorporating two opposing elongated sidewalls of sufficient width to be modified to accommodate a conventional lockset and the outside wall configured to be modified to have at least one cutout for receiving at least one lock faceplate positioned to insert a latch bolt of the conventional into a latch opening in the slot cover when the gate is closed.

2. The gate for a fence system of claim 1, wherein the inside wall of the first upright fence column is rectangular.

3. The gate for a fence system of claim 1 wherein the at least two elongated sidewalls of sufficient width to accommodate a conventional lockset are substantially two inches wide.

4. The gate for a fence system of claim 1 wherein:

the dimensions of a conventional lockset are a lock bore of approximately two and one-eighth inches and a width of approximately two inches.

5. The fence system of claim 4 wherein the second upright fence column has at least one cutout in the outside wall for at least one lock faceplate positioned to insert a latch from a conventional lockset into the latch opening of the extension.

6. The gate for a fence system of claim 1 wherein the strike extension has at least one cutout into which a latch can protrude.

7. The gate for a fence system of claim 1 wherein the at least one cutout in the outside wall for at least one lock faceplate has dimensions substantially one inch wide by two and one fourth inches tall.

8. A gate for a fence system comprising:

a stationary first upright fence column, formed of a single piece, the first upright fence column having a first inside wall sized to receive a base post and a first outside wall around the first inside wall;

the first upright fence column including a first at least one slot extending the length of the first upright fence column from the first outside wall toward the first inside wall, the first at least one slot adapted to receive a slat having a length and a height extending from the first outside wall through the first at least one slot to the first inside wall, the first at least one slot having opposing grooves along opposing sidewalls thereof;

a slot-received strike plate comprising a single-piece, the strike plate comprising:

a slot cover extending the length of the first at least one slot and configured to be modified to incorporate a first latch opening to receive a tongue of a conventional lockset;

a pair of opposing clip walls extending through and along the length of the first at least one slot and having two opposing distal shoulders adapted to engage the opposing grooves within the first at least one slot; and a strike extension extending the length of the slot cover against which a second upright fence column may sit when the gate is closed;

the slot-received strike plate engaging the first at least one slot such that the two opposing distal shoulders engage the opposing grooves;

a second upright fence column forming a portion of a gate panel, formed of a single piece, the second upright fence column being substantially hollow in cross-section, having a second at least one slot extending the length of the second upright fence column adapted to receive a fence slat therein and a second outside wall around the second at least one slot, the second outside wall having two opposing elongated sides of sufficient width to be modified to accommodate a conventional lockset and the outside wall configured to be modified to have a second latch opening positioned to insert a tongue of the conventional lockset into a first latch opening in the slot cover when the gate is closed.

9. The gate for a fence system of claim 8, wherein the sufficient width includes a lockset width, parallel to the length of the second at least one slot, the lockset width sufficient to mount the conventional lockset.

10. The gate for a fence system of claim 9, wherein the conventional lockset has dimensions for a lock bore of substantially two and one-eighth inches and a width of substantially two inches.

11. The gate for a fence system of claim 9 further comprising:

a lockset housing mounted on the lockset width of the second upright fence column;

the second upright fence column having a portion of the second outside wall adjacent to the first upright fence column and opposite the second at least one slot.

12. The gate for a fence system of claim 8 wherein each of the first and second upright fence columns are formed of aluminum.

13. The gate for a fence system of claim 8 further comprising:

a conventional lockset installed between the two elongated sides of the second upright fence column.

14. The gate for a fence system of claim 8 wherein the conventional lockset is installed passing through both of the two elongated sides of the second upright fence column with a tongue of the conventional lockset extending outward toward the slot-received strike.

15. The gate for a fence system of claim 14 wherein the slot-received strike plate is modified to incorporate a latch to receive the tongue of the conventional lockset.

16. A gate for a fence system comprising:

a gate fence post forming a portion of a gate panel, formed of a single piece, the gate fence post being substantially hollow in cross-section, having a gate slot on a first side extending the length of the gate fence post, adapted to accept one or more fence slat therein extending outward from the gate slot;

the gate fence post having a flat side, opposite the first side, adapted to be modified to have a first latch opening positioned to receive a tongue of a conventional lockset;

the gate fence post having two parallel lockset faces, perpendicular to the first side and the flat side, adapted to be modified to accept the lockset;

a stationary gate strike fence post, formed of a single piece, the gate strike fence post having a strike slot extending the length of the gate strike fence post, the strike slot having two opposing grooves along opposing sidewalls thereof, each of the two grooves adapted to receive one of two distal shoulders on a slot-received strike plate; and a slot-received strike plate including:

a slot cover extending the length of the strike slot and configured to be modified to incorporate a second latch opening to receive a tongue of a conventional lockset from the first latch opening in the gate fence post when the gate is closed;

a pair of opposing clip walls extending through and along the length of the strike slot and having the two opposing distal shoulders engaged within the opposing grooves of the strike slot; and a strike projection extending the length of the slot cover on one side of the gate strike fence post such that the strike projection engages the gate fence post to disable movement of the gate fence post past the strike projection when the gate is closed.

* * * * *